Feb. 4, 1958 W. KUNZE 2,821,805
FISH FINDING APPARATUS
Filed April 14, 1954
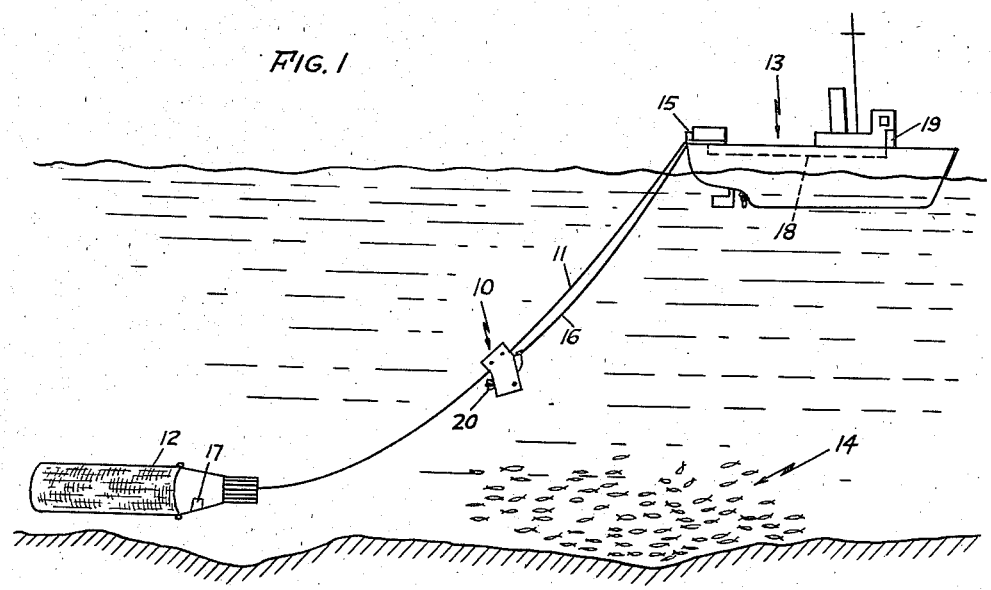
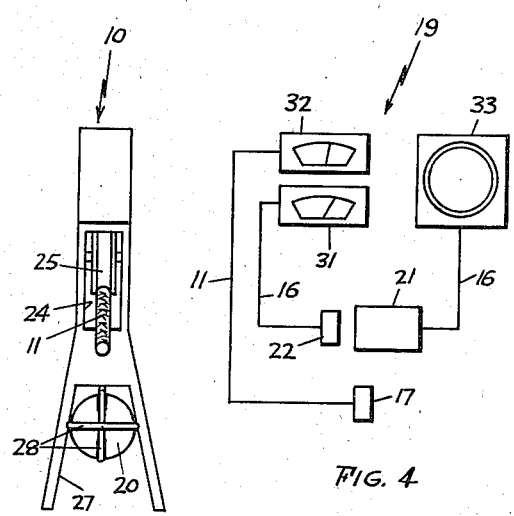
INVENTOR
WILLY KUNZE
BY
ATTORNEY

United States Patent Office 2,821,805
Patented Feb. 4, 1958

2,821,805

FISH FINDING APPARATUS

Willy Kunze, Bremen, Germany, assignor to Raytheon Manufacturing Company, Waltham, Mass., a corporation of Delaware Application April 14, 1954, Serial No. 423,202

5 Claims. (Cl. 43—17.1)

This invention relates to sonic depth sounding equipment as utilized to find fish, and more particularly to means whereby such equipment can be positioned at will at depths intermediate the ship and a towed fishing net.

It is well known that fish can be located by means of sonic depth sounding equipment. Likewise, it is known that the depth at which a towed fishing net is employed can be varied to intercept fish at the depth indicated by such finding equipment. However, heretofore the sounding equipment has been affixed to the ship, as, for example, the echo sounding transducer has been positioned on the bottom side of the hull, and this equipment was therefore subject to disturbances originating within the ship. Thus, propeller vibrations, motor noises and the like often caused a region of disturbance during fish finding operations which decreased the efficiency of the fish-finding equipment. Furthermore, the ability to distinguish a school of fish, particularly those located close to the sea bottom, was also directly affected by the echo distance between the transducer and the sea bottom. Therefore, it is quite desirable to remove the transducer from the region of disturbance previously mentioned, and it is equally desirable to reduce the distance between the transducer and the sea bottom in order to facilitate fish finding operations.

This invention discloses a device wherein a transducer can be housed and suspended in the water and towed by the ship. It also involves the use of a fishing net tow line as the carrier for this device whereby it can be positioned at will along this tow line at depths intermediate the ship and the net. In accordance with this invention, one embodiment comprises as the carrier for the echo sounding transducer a movable car which rides on the tow line connecting the fishing net to the ship. This car is provided with a check line or cable to raise or lower the car with respect to its position along the tow line. Such an arrangement has the advantage of using the existing fishing apparatus for towing the net. In addition, the transducer is removed from the region of disturbance caused by the ship and can be lowered to a more satisfactory depth in order to locate fish which are near the sea bottom.

This invention and the features thereof will be understood more clearly and fully from the following detailed description of one embodiment of the invention with reference to the accompanying drawing wherein:

Fig. 1 shows a fish findinng apparatus made in accordance with this invention;

Fig. 2 illustrates a side cross-sectional view of a tow line car carrying an echo sounding transducer;

Fig. 3 shows an end view of the tow line car illustrated in Fig. 2; and

Fig. 4 shows a block diagram of the electrical circuitry employed to utilize the fish finding apparatus.

Referring now to Fig. 1, a tow line car 10, made in accordance with the principles of this invention, and adapted to ride on a tow line 11 connecting a fishing net 12 to a ship 13, is shown. The details of the car 10 will be described below. However, the general method of using this car can be understood with reference to Fig. 1. The net 12 is shown in a submerged position as employed to intercept a school of fish 14. This net can be raised or lowered by any of a number of suitable means, such as by means of a winch 15, for example, for reeling in or paying out the tow line 11. The car 10 is affixed to the tow line 11, as will be described below, after the net has been submerged, and the car 10 is moved along the tow line by a check line 16 which is attached at one end to the car and at the other end to the winch. Thus, it can be seen that the car can be positioned at any depth intermediate the surface of the water and the depth of the net.

The fishing net 12 is provided with a depth gauge 17 which is electrically connected through the tow line 11 and an internal cable 18, shown as a dotted line in Fig. 1, to one of a set of indicating means 19 on board the ship. The tow line car 10 is adapted to carry a torpedo-like floating chamber 20 wherein a sonic transducer 21 and another depth gauge 22, as shown in Fig. 2, are housed. The transducer and the depth gauge are electrically connected through the check line 16 to two additional indicating devices on board the ship. Thus, the depths of the car 10 and the net 12 and the distance between the car and a school of fish 14 can be determined. It should be noted that the depth at which the net 12 is submerged can be controlled by any of a number of suitable means to position the net at any desired depth.

By referring now to Figs. 2 and 3, the details of the tow line car 10 and its operation can be understood. The upper section of this car consists of a passageway 24 in which a pair of trolley wheels 25 and 26, each of which is designed to ride on the tow line 11, are mounted. The passageway 24 should be narrow in width to prevent the tow line from slipping off of the wheels. The lower tunnel-shaped section 27 of this car, which is open along the bottomside as shown in Fig. 3, is utilized to house the torpedo-like chamber 20 previously mentioned. This chamber 20 will float when submerged and is designed in the shape of a torpedo to decrease water resistance. The chamber 20 is also provided with a set of fins 28 which keep the chamber in a horizontal position when it is being moved through the water. Thus, the directional characteristic of the transducer 21 is always such that sonic waves will be directed toward the sea floor.

The chamber 20 is retained in the lower section of the car by means of a pivot 29 connected to each side of the tunnel-like section 27. It should also be noted that a link connection 30 to which the check line 16 is joined is utilized to prevent undue tension from acting on that portion of the line which is directly connected to the transducer 21 and the gauge 22. It can be seen that the major section of the check line 16 and the link connection 30 actually provide the means for raising and lowering the tow line car 10.

By referring now to Fig. 4, the electrical circuitry employed to utilize the fish-finding apparatus can be seen. The set of indicating means 19, previously mentioned with regard to Fig. 1, consists of two depth gauge indicating devices 31 and 32 and a depth sounding indicator 33. Depth gauge 22, that is the gauge housed in the chamber 20 shown in Fig. 2, is connected through the electrically conductive check line 16 to indicating device 31. Likewise, the depth gauge 17, as illustrated in Fig. 1, is electrically connected through the tow line 11 to indicating device 32. Thus, by referring to the respective depths shown on devices 31 and 32, the relative positions of the net 12 and the tow line car 10 can be determined. Also, as shown in Fig. 4, the transducer 21 is electrically connected through the check line 16 to an indicator 33, which enables an observer on board the ship to determine the distance between the tow line car 10 and a school of fish or the sea floor.

It may be seen that once the respective depths of the net 12 and the car 10, and the distance between the car 10 and the school of fish, are determined, the net can be raised or lowered as desired to intercept the fish. The advantages previously discussed are now readily apparent, and it becomes obvious that the transducer 21 has been removed from any region of disturbance created within the ship 13. Furthermore, the transducer is in a far better position to indicate those fish which are located close to the bottom of the sea. Likewise, it can be seen that the car 10 can be raised or lowered during fish-finding operations to provide the transducer 21 with a greater area of coverage in which fish may be found.

However, this invention should not be limited to the particular details described above as many equivalents will suggest themselves to those skilled in the art. For example, the car 10 might be towed independently of the line connecting the net to the ship. Furthermore, this car could also be utilized for other purposes, as in cases where signalling equipment is used in connection with deep sea measuring devices. In addition, the electrical circuitry can be varied and the transducer 21 and gauges 17 and 22 can be connected to suitable indicating means in any of a number of ways. Thus, it is desired that the appended claims be given a broad interpretation commensurate with the scope of the invention within the art.

What is claimed is:

1. A fish finding system comprising means for catching fish, means connected between said fish catching means and a vessel for towing said fish catching means, means carried on said fish catching means for generating a first signal as a function of the depth of said fish catching means, a device carried on said towing means and adjustably positioned on said towing means from said vessel, means carried on said device for generating a second signal as a function of the depth of said device, a transducer carried on said device for transmitting and receiving sonic energy, means carried on said vessel responsive to the outputs of said first and second signal generating means and said transmitting and receiving means for indicating the depths of said fish catching means, said device and objects reflecting sonic energy, whereby said device is positioned intermediate said vessel and said fish catching means and said fish catching net may be positioned to intercept said objects.

2. A fish finding system comprising means for catching fish, means connected between said fish catching means and a vessel for towing said fish catching means, means carried on said fish catching means for generating a first signal as a function of the depth of said fish catching means, a buoyant device movably attached to said towing means and carried on said towing means, means connected between said device and said vessel for positioning said device intermediate said vessel and said fish catching means, means carried on said device for generating a second signal as a function of the depth of said device, a transducer carried on said device for transmitting and receiving sonic energy, means carried on said vessel for energizing said transducer, means carried on said vessel responsive to the outputs of said first and second signal generating means and said transducer for indicating the depths of said fish catching means, said device, and objects reflecting sonic energy, means for coupling said first and second generating means and said transducer to said indicating means, whereby said fish catching means may be positioned to intercept said objects.

3. A fish finding system comprising means for catching fish, means connected between said fish catching means and a vessel for towing said fish catching means, a pressure actuated device carried on said fish catching means for generating a signal as a function of the depth of said fish catching means, a buoyant device movably attached to said towing means and carried on said towing means and having means connected thereto and to said vessel for positioning said device on said towing means from said vessel, means carried on said device for generating a signal as a function of the depth of said device, a transducer carried on said device for transmitting and receiving sonic energy, means carried on said vessel responsive to the outputs of said pressure device and said signal generating means and said transmitting and receiving means for indicating the depths of said fish catching means, said device, and the position of objects reflecting sonic energy, whereby said device may be positioned intermediate said vessel and said fish catching means and said fish catching net may be positioned to intercept said objects.

4. A fish finding system comprising means for catching fish, means connected between said fish catching means and a vessel for towing said fish catching means, a first actuated pressure device carried on said fish catching means for generating a signal as a function of the depth of said fish catching means, a device including a floating chamber wherein are carried a second pressure actuated device for generating a signal as a function of the depth of the device and a transducer for transmitting and receiving sonic energy, said device being carried on said towing means and movably attached thereto, means connected to said device and to said vessel for adjusting the position of said device on said towing means from said vessel, means carried on said vessel responsive to the outputs of said first and second pressure devices and said transducer for indicating the depths of said fish catching means, said device, and objects reflecting sonic energy, means for coupling said pressure actuated devices and said transducer to said indicating means, whereby said fish catching means may be positioned to intercept said objects.

5. A fish finding system comprising means for catching fish, means connected between said fish catching means and a vessel for towing said fish catching means, a first actuated pressure device carried on said fish catching means for generating a signal as a function of the depth of said fish catching means, a buoyant device carried on said towing means having wheels in contact with said towing means in a manner to ride on said towing means, means attached to said device and to said vessel for positioning said device on said towing means intermediate said fish catching means and said vessel, a transducer carried on said device for transmitting and receiving sonic energy, a second pressure actuated device carried on said device for generating a signal as a function of the depth of said device, said device including means for maintaining said device in a substantially horizontal position independently of the movements of said vessel and said device, means carried on said vessel responsive to the outputs of said pressure actuated devices and said transducer for indicating the depths of said fish catching means, said device, and objects reflecting sonic energy, and means for coupling said pressure devices and said transducer means to said indicator means, whereby said fish catching means may be positioned to intercept said objects.

References Cited in the file of this patent

UNITED STATES PATENTS

| 418,889 | Cooper et al. | Jan. 7, 1890 |
| 720,643 | Wallace | Feb. 17, 1903 |
| 2,480,561 | Ewing et al. | Aug. 30, 1949 |
| 2,631,270 | Goble | Mar. 10, 1953 |
| 2,729,910 | Fryklund | Jan. 10, 1956 |

FOREIGN PATENTS

| 70,706 | Norway | July 15, 1946 |
| 637,296 | Great Britain | May 17, 1950 |

U. S. DEPARTMENT OF COMMERCE
PATENT OFFICE
CERTIFICATE OF CORRECTION

Patent No. 2,821,805 February 4, 1958

Willy Kunze

It is hereby certified that error appears in the printed specification of the above numbered patent requiring correction and that the said Letters Patent should read as corrected below.

Column 3, line 45, for "net" read -- means --; column 4, lines 19 and 40, for "actuated pressure", each occurrence, read -- pressure actuated --.

Signed and sealed this 20th day of May 1958.

(SEAL)
Attest:
KARL H. AXLINE
Attesting Officer

ROBERT C. WATSON
Commissioner of Patents